United States Patent Office 3,134,072
Patented May 19, 1964

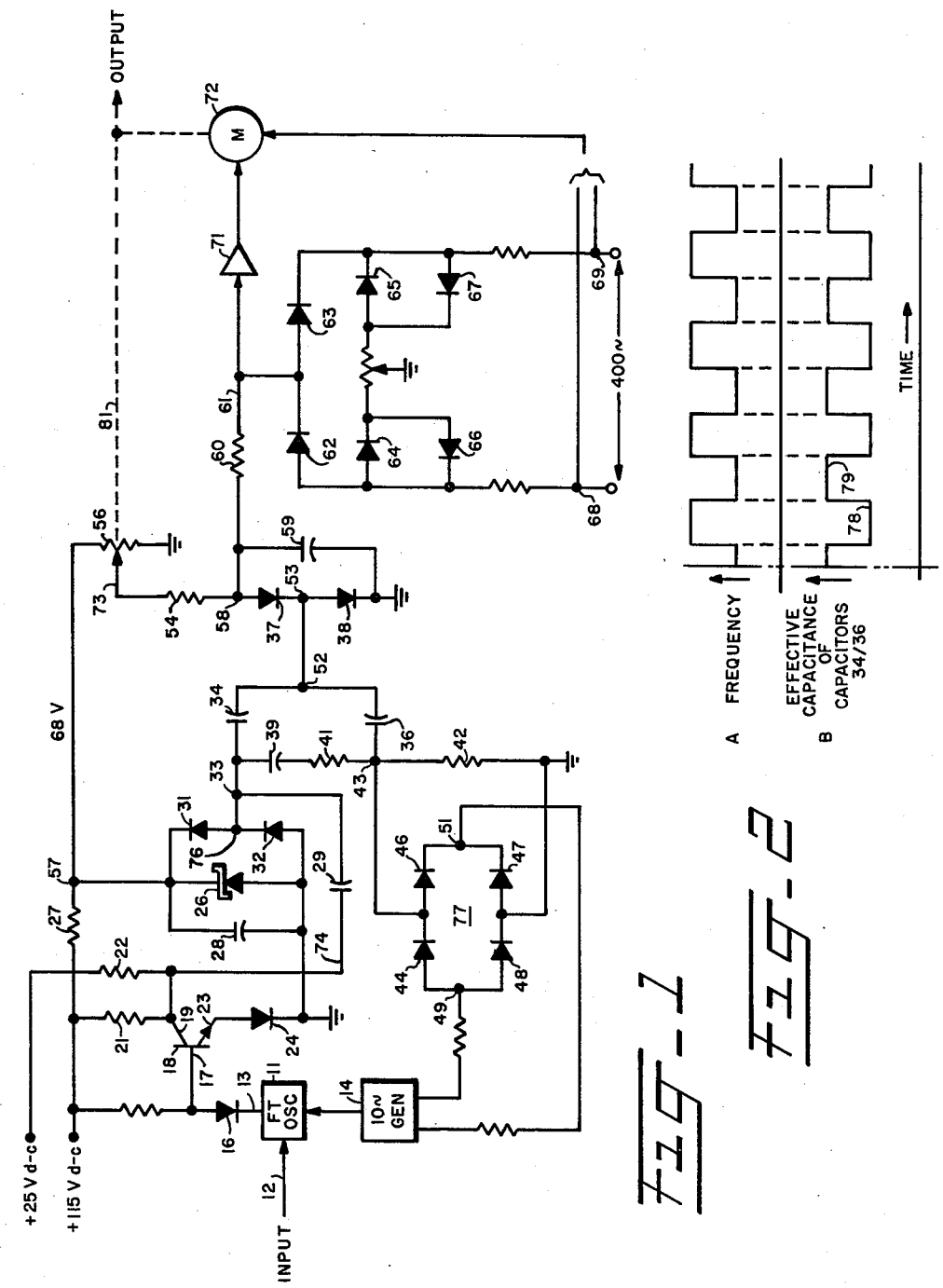

3,134,072
FREQUENCY MEASURING SYSTEM INCLUDING SYNCHRONOUSLY VARIABLE CAPACITORS AND SERVO INDICATING MEANS
John W. Gray, Pleasantville, and Joseph Reed, New Rochelle, N.Y., assignors to General Precision, Inc., a corporation of Delaware
Filed Dec. 28, 1960, Ser. No. 79,058
7 Claims. (Cl. 324—78)

This invention relates to aircraft Doppler radar equipment and more particularly to frequency indication readout devices therefor.

Doppler radar equipment for measuring aircraft ground speed and drift angle requires the use of a frequency tracking device to acquire the Doppler spectrum, measure the center frequency of the spectrum, and lock to this center frequency. Such a frequency tracker is described in U.S. Patent No. 2,915,748.

In a resonant frequency tracker it is necessary to secure an error signal having sense as well as magnitude. In one method the oscillator of the frequency tracker is varied at a low rate between two frequencies. Such a frequency modulation may be at the rate of, for example, 10 c.p.s. When the modulating 10 c.p.s. signal has a square wave form the modulated oscillator output dwells, for example, alternately on two frequencies separated by 12% of the average frequency.

An oscillator thus frequency modulated is incorporated in a frequency tracker described in U.S. patent application Serial No. 686,808 filed September 23, 1957, now Patent No. 2,994,865 issued August 1, 1961. Another oscillator suitable for use in connection with this invention is described in U.S. patent application Serial No. 17,191 filed March 23, 1960, now Patent No. 3,077,567 issued February 12, 1963.

When the frequency tracker output is secured from the oscillator output, the system output has the maximum accuracy. But when a frequency-modulated oscillator is employed it becomes difficult to secure a system output signal representing a selected, constant function of the average oscillator frequency. It is not practical to smooth out the frequency modulation by rectifying the oscillator output and employing a large smoothing filter because of the large time lag introduced and because, if used in conjunction with an output servomechanism, this method would cause instability and hunting of the output shaft. This invention however, provides a circuit with a stable output representing the average oscillator frequency.

The invention provides a diode frequency metering circuit having an output current, $i$, proportional to the product of the input frequency, $f$, and the capacitance of a measuring capacitor, C. That is $$i = KfC \quad (1)$$

The capacitor C is adjustable to two values of capacitance having, in one example, an effective difference of 12%. This capacitor is switched between its two values in synchronism with the 10 c.p.s. 12% modulation of the oscillator in such a way that when $f$ has its larger value, C has its smaller value, and vice versa. Thus the product is constant. An output representing this product has a constant relation to the Doppler spectrum center frequency and is employed as the frequency tracker output.

The object of this invention is to provide a circuit for accurate readout of a frequency tracker employing a frequency-modulated oscillator.

A further understanding of this invention may be secured from the following detailed description and drawings, in which:

FIGURE 1 is the schematic circuit of an embodiment of the invention.

FIGURE 2 depicts graphs illustrating operation of the invention.

Referring now to FIGURE 1, an oscillator 11 forms part of a frequency tracker and is of the frequency-modulated kind described in U.S. Patent No. 3,077,567. Its input conductor 12 has imposed thereon a direct potential obtained from the frequency tracker loop to control its frequency. As an example, the range of voltage on conductor 12 of zero to +10 volts controls the oscillator output 13 between the average frequencies of 1.5 k.c.p.s. and 30 k.c.p.s. The oscillator 11 is, additionally, frequency modulated by square-wave potential applied from a 10 c.p.s. generator 14 so that at any frequency within its range it is modulated above and below its average frequency by 6%.

The signal in oscillator output conductor 13 is applied through a diode 16 to the base 17 of a transistor 18. The transistor collector 19 is connected to a +115 volt source through a resistor 21 and to a +25 volt source through a resistor 22. The resistances of resistors 21 and 22 are so proportioned that in the no-load condition the collector potential is +90 volts. The emitter 23 is grounded through a protective diode 24. This network constitutes a limiting amplifier for producing a rectangular waveform.

A zener diode 26 together with a resistor 27 and capacitor 28 constitutes a 68-volt voltage reference. The potential of collector 19 is coupled to the voltage reference through a coupling capacitor 29 and two limiting diodes 31 and 32, so that the output at conductor 33 has the approximate limits of zero and 68 volts.

The alternating potential in conductor 33, thus voltage limited, is applied to a frequency-measuring circuit consisting principally of capacitors 34 and 36, and diodes 37 and 38. The input signal is applied from conductor 33 to capacitor 36 by means of a large coupling capacitor 39 and a voltage divider consisting of resistors 41 and 42, with the common terminal 43 connected to apply the input signal to capacitor 36. A switch-type modulator comprising four diodes, 44, 46, 47 and 48, is connected across resistor 42. The modulator is provided with an input at terminals 49 and 51 from the 10 c.p.s. generator 14. The common junction 52 of the capacitors 34 and 36 is connected to the common junction 53 of the diodes 37 and 38. Potential is applied to these diodes through a resistor 54 and potentiometer 56 connected to the 68-volt terminal 57. The output taken from junction 58, smoothed by a capacitor 59, is a direct current error signal.

The general principles of such a frequency metering circuit for use in measuring a single-valued input frequency are disclosed in U.S. Patent No. 2,584,866, and are briefly as follows.

Consider that an alternating potential is applied to the capacitor 34 from conductor 33, and that the frequency and time constants are such that in each half cycle the capacitor is substantially fully charged in much less than the time of one-half cycle. The charge, $q$, attained at the applied potential V, during one-half cycle is $$q = CV \quad (2)$$

When the capacitor is positively charged, the positive charge from its other plate is drained to ground as a current flow, $i$, through diode 38. It is desirable to assume in an elementary explanation that the potential at point 58 remains at zero, and that the diodes 37 and 38 have, when conducting, zero resistance, so that the potential at point 53 remains at zero. When the capacitor 34 is negatively charged during the negative half cycle of applied potential an equal current, $i$, is drawn through the diode 37. Since unit current is defined as the passage of a unit charge in unit time, current at junction 58 is simply charge per cycle times frequency in cycles per second, or $$i = CVf \qquad (3)$$

At null, all of this current is drawn through resistor 54 so that, when its resistance is R, the potential E to ground at slider 73 is $$E = RCVf \qquad (4)$$

The signal at junction 58 is transmitted through a resistor 60 and conductor 61 to the input of an amplifier 71. At this input conductor the direct-current signal is converted to an alternating current signal for more convenient amplification by a switch-type modulator comprising diodes 62, 63, 64, 65, 66 and 67. A 400-c.p.s. power source is connected to terminals 68 and 69. Diodes 66 and 67 have the function of preventing high voltage from being impressed on the modulator during the inverse half of each cycle of the 400 c.p.s. supply, while preserving the abrupt switch action.

The signal in conductor 61, modulated at 400 c.p.s., is amplified in the alternating current amplifier 71 and applied to a two-phase motor 72 having its other phase supplied from the 400 c.p.s. line. The motor runs in a direction corresponding to the amplified signal applied to it, and positions the slider 73 of potentiometer 56. For example, if the D.-C. potential at point 58 is negative, it will cause the motor 72 to move the slider 73 to a position of higher potential on potentiometer 56. The resulting change of current in resistor 54 thus restores the potential of point 58 to zero. At equilibrium, the potential at the slider 73 is E as defined by Equation 4, and the potentiometer shaft angle provides an indication of the input frequency.

In the operation of this circuit let it be assumed that the Doppler spectrum center frequency is 10,000 c.p.s. and that the frequency tracker loop is in exact balance. The direct potential applied at conductor 12 is then such as to cause the oscillator 11 to oscillate at 10,000 c.p.s. However, the 10 c.p.s. generator 14 square-wave-modulates this direct potential to such values as to cause the oscillator to operate alternately at 9400 c.p.s. and 10,600 c.p.s.

This output is applied, at a few volts potential, to the base 17 of transistor 18. During the positive half cycle diode 16 is nonconductive and transistor 18 is conductive, with the potential of the collector 19 and output conductor 74 not more than +2 volts. During the negative input half cycle diode 16 is conductive and transistor 18 is nonconductive, so that its collector and conductor 74 rise to about +80 volts. The collector waveform is rectangular.

This waveform is applied to the midjunction 76 of the limiting diodes, where the waveform is clipped to the Zener potential of 68 volts and ground, plus the potential drops produced by diodes 31 and 32.

This signal is applied to the frequency-metering capacitor 34 directly, and indirectly to the other frequency-metering capacitor 36. Application to the latter is through a coupling capacitor 39 which is so large that its reactance may be neglected. The resistors 41 and 42 are equal, so that the potential applied to the capacitor 36 is one-half of the potential of conductor 33. Since the charge, q, applied to a capacitance, C, is equal to the product of the capacitance and the voltage, V, of the charge, or $q = CV$, the action of capacitor 36 is the same as if a capacitor of one-half of its capacitance were connected directly in shunt with capacitor 34.

Use of this scheme provides a convenient way of switching capacitor 36 into and out of the circuit electronically. The diode switch modulator 77 is shunted across resistor 42 and is operated by generator 14. When terminal 49 is positive, junction 43 is effectively grounded, preventing capacitor 36 from charging. When terminal 51 is positive, the four diodes 44, 46, 47 and 48 are nonconductive and capacitor 36, being ungrounded, is charged from conductor 33.

This results in an output current at terminal 52 from which the variation caused by oscillator frequency modulation at 10 c.p.s. has been eliminated, as is shown in FIGURE 2. In this figure graph A represents the variation in frequency of the alternating current on conductor 33, at 10 c.p.s. Graph B to the same time scale depicts the sum of the effective capacitances of capacitors 34 and 36. During the half cycle 78 only capacitor 34 is in circuit and the product of its capacitance and the frequency is proportional to the current $i$. During the next half cycle, 79, both capacitors 34 and 36 are in circuit and the sum of their effective capacitances, multiplied by a lesser frequency, again is proportional to current. Since the current into the capacitors must equal the current out of them, the two products are equal.

The current $i$, passing through diode 37 into the capacitors, is proportional to frequency when the potential at slider 73 has a selected value. At any other value a current passes to the amplifier 71, which operates motor 72, feeding a position change back to slider 73, which changes so that the potential drop, E, in resistor 54 has the selected value in accordance with Equation 4. Input to the amplifier then ceases, the motor stops, and the angular deflection of shaft 81, representing the position of slider 73, becomes an exact measure of the current, $i$, through diode 37 into the capacitors and therefore is also, in accordance with Equation 3, proportional to the average frequency of the oscillator.

Thus the constant output signal becomes an exact measure of the average frequency of a constantly and regularly varying oscillator. This output signal is therefore an exact linear function of the Doppler spectrum central frequency which is being tracked by the frequency tracker.

What is claimed is:

1. A readout circuit for use with a frequency tracker oscillator comprising, means for alternating the output signal frequency of said oscillator between two selected values, frequency-measuring means including an adjustable capacitative system producing an output signal the amplitude of which is representative of of an input signal frequency impressed thereon, and means adjusting said adjustable capacitative system in synchronism with said oscillator frequency alternations to produce a constant product of frequency and capacitance.

2. A readout circuit for use with a frequency tracker oscillator comprising, switching means switching the output signal frequency of said oscillator between two selected values, frequency-measuring means including an adjustable capacitative system producing an output signal the amplitude of which is representative of the product of the frequency of the signal impressed thereon and the capacity of said adjustable capacitative system, means applying said oscillator output to said frequency-measuring means, and means operated by said switching means to adjust said adjustable capacitative system in synchronism with the switching of said oscillator to produce the same output signal amplitude at both of said two selected values of frequency.

3. A readout compensator for use with a frequency tracker oscillator comprising, switching means switching the frequency of said oscillator alternately between two values, frequency-measuring means including a capacitative system adjustable to either one of two values of capacitance, said adjustable capacitance values being selected so that at any time the product of the instant capacitance value and of the instant oscillator frequency is a constant, said frequency measuring means producing an output signal the amplitude of which is representative of the product of the frequency of the signal imposed thereon and the capacity of said capacitative system, means applying said oscillator signal to said frequency-measuring means, and means operated by said switching means to adjust said adjustable capacitative system alternately to said two values of capacitance at the same rate and in phase opposite to the phase of the switching of the oscillator signal, whereby the output signal amplitude of said frequency-measuring means always linearly represents the average of said two values of oscillator frequency.

4. A readout compensator comprising, an oscillator, means for causing said oscillator to oscillate alternately at two discrete values of frequency, frequency measuring means including a capacitative system having alternate values of capacitance so selected that the produce of one said alternate value of capacitance and one said discrete value of frequency equals the product of the other said alternate value of capacitance and the other said discrete value of frequency, the output signal of said frequency measuring means having an amplitude representative of said equal products, means applying said oscillator output to said frequency measuring means, and means indicating the output signal amplitude of said frequency measuring means.

5. A readout compensator providing a signal representing the average frequency of a frequency-modulated oscillator comprising, an oscillator, means for causing said oscillator to oscillate alternately at two discrete values of frequency, a wave-shaping circuit means increasing the rectangularity of said oscillator output, a limiter means limiting the voltage of said wave-shaping circuit output, frequency measuring means including an adjustable capacitative system producing an electrical output signal the amplitude of which is representative of the product of the frequency of the signal impressed thereon and the capacitance of said capacitative system, and square wave generator means adjusting said capacitative system in opposite phase to the phase of said oscillator frequency changes whereby said product constantly represents the average of said oscillator frequencies.

6. A frequency tracker readout device in accordance with claim 5 including a position servomechanism converting said frequency-measuring means output signal to a shaft angular position representing the magnitude of the output signal.

7. A readout compensator providing a signal representing the average frequency of a frequency-modulated oscillator comprising, means modulating said oscillator at a selected modulation frequency and phase to cause the oscillator output to assume alternately two discrete values of frequency, wave-shaping means increasing the rectangularity of said oscillator output, frequency-measuring means including an adjustable capacitative system producing an electrical output signal the amplitude of which is representative at the null condition of the product of the frequency of the signal impressed thereon and the capacitance of said capacitative system, means operated by said modulating means for adjusting said capacitative system to alternate capacities in opposite phase to the phase of the frequency modulation of said oscillator to secure constancy of said electrical output signal during a frequency modulation cycle, and position servo means feeding back the information of said electrical output signal to said frequency-measuring means to produce said null condition whereby the position servo position represents said average frequency.

References Cited in the file of this patent
UNITED STATES PATENTS

| | | |
|---|---|---|
| 2,584,866 | Gray | Feb. 5, 1952 |
| 2,747,095 | Boucke | May 22, 1956 |
| 2,949,604 | Williams | Aug. 16, 1960 |
| 2,957,135 | Gray | Oct. 18, 1960 |